March 16, 1965 M. P. XYLANDER 3,174,058

BILATERAL CURRENT DRIVER

Filed Oct. 2, 1961

*INVENTOR*
MELVIN P. XYLANDER

BY Leo J. Aubel

*ATTORNEY*

3,174,058
BILATERAL CURRENT DRIVER

Melvin P. Xylander, Apalachin, N.Y., assignor to International Business Machines Corporation, New York, N.Y., a corporation of New York
Filed Oct. 2, 1961, Ser. No. 142,249
5 Claims. (Cl. 307—88.5)

This invention relates to a current control circuit and more particularly to a circuit for providing bilateral current drive, that is, for providing current flowing in one direction or another according to control signals.

It is a principal object of the present invention to provide an improved electronic circuit arranged to provide bilateral current drive.

It is another object of the present invention to provide a bilateral current driver circuit which can be operated at low frequencies and also by direct current control.

In a number of prior art circuits, bilateral circuits are arranged such that in operation, current must continually flow in one or the other direction.

Accordingly, it is another object of the present invention to provide a bilateral current driver which has an off position where no current will flow through the loads.

Prior art bilateral current driver circuits have a problem of controlling the current flowing in the two directions to be of selected amplitudes.

Accordingly, it is another object of the present invention to provide a bilateral current driver to provide bilateral current flow of selected amplitudes.

It is another object of the present invention to provide a bilateral current driver utilizing only one type of transistor or electron tubes.

It is another object of the present invention to provide a bilateral driver to drive a variety of devices such as magnetic cores, as a direct current motor drive in a servo system, or as a low impedance loud speaker driver for purposes of eliminating the need of an output transformer.

It is another object of the present invention to provide a bilateral current driver for a switch core matrix to reduce the number of wires in the matrix since one wire can be used to drive current in both directions.

In one embodiment of the invention, a bilateral current driver is provided for driving current through a load in one or the other direction. The circuit includes two control devices in the form of transistors; the control signals which determine the direction of current flow are connected as respective inputs to the control transistors. The collectors of the control transistors are connected to respective associated transistors connected as emitter followers, and to respective terminals of the load. Impedance means are connected as voltage dividers across the emitter followers to provide biasing potentials thereto.

The control signals are alternately applied to the two control transistors. When one control transistor is caused to conduct, the emitter follower associated with the other control transistor is also caused to conduct and current flows from positive potential, through the emitter follower, through the load and through the control transistor to ground. When the other control transistor is caused to conduct, current flows from positive potential through the other emitter follower, through the load in the opposite direction and through the control transistor to ground.

The foregoing and other objects, features and advantages of the invention will be apparent from the following more particular description of preferred embodiments of the invention, as illustrated in the accompanying drawings.

In the drawings in which like reference characters refer to like elements throughout:

Figure 1:
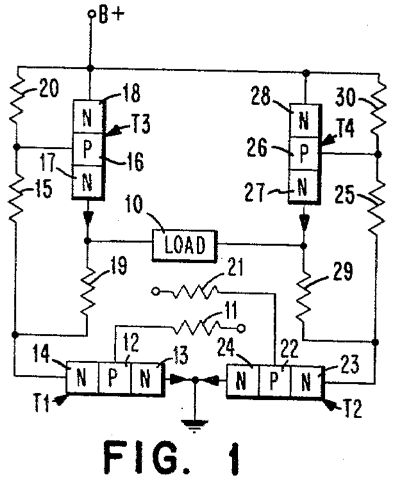
FIG. 1 is a schematic diagram of a transistor circuit for driving current in either direction through a load.
Figure 2:
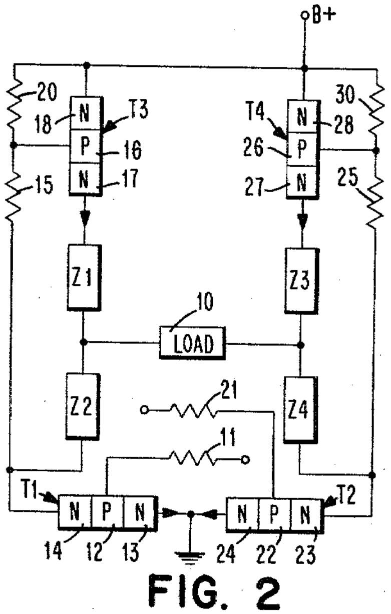
FIG. 2 is an alternative embodiment of a circuit of FIG. 1.
Figure 3:
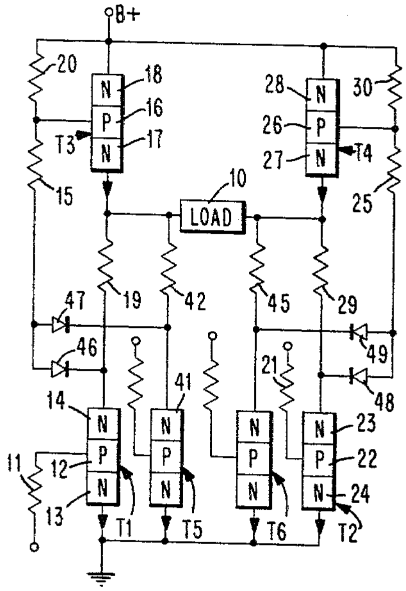
FIG. 3 is a third embodiment of a circuit of the invention for providing different current amplitudes to the load as desired.

FIGS. *4a*, *4b* and *4c* show the wave forms of current flow which may be provided by the circuits of FIGS. 1, 2 and 3 as indicated in the specification.

As noted, the invention discloses circuitry for driving current through either a first, say positive, or an opposite, say negative, direction. The circuit includes electron control devices in the form of transistors.

Referring to FIG. 1, each of the transistors T1, T2, T3 and T4 are of the NPN type; PNP type transistors could likewise be employed by providing proper biasing potentials as is well known in the art. All of the transistors in the circuit may be of the same type, each having a base emitter and collector electrodes. Note that the circuit is symmetrical in arrangement. The two input control signals which determine the direction of current flow are connected through resistors 11 and 21 to the bases 12 and 22 of the two control transistors T1 and T2, respectively.

Transistor T1 is caused to conduct by an input signal applied through resistor 11 to its base 12. In the circuit, the various impedance elements are indicated as resistors. The emitter 13 of transistor T1 is connected to ground reference, and its collector 14 is connected through a resistor 15 to the base 16 of transistor T3. Collector 14 of transistor T1 is also connected through resistor 19 to the emitter electrode 17 of transistor T3 which is connected as an emitter follower. The collector 18 of transistor T3 is connected to positive or B+ potential. B+ potential is also connected to the base 16 of transistor T3 through a resistor 20. The junction of resistor 19 and emitter 17 connects to one terminal of an electrical load 10, indicated simply as a resistor.

Transistors T2 and T4 and the associated components are connected to form the opposite, mirror or corresponding side of the symmetrical circuit of the invention. More specifically, a control signal is applied through a resistor 21 to the base 22 of transistor T2. The emitter 24 of transistor T2 is connected to ground reference; the collector 23 is connected through a resistor 25 to the base 26 of transistor T4. Collector 23 of transistor T2 is also connected through a resistor 29 to the emitter 27 of transistor T4. The collector 28 of transistor T4 is connected to B+ potential. The base electrode 26 of transistor T4 is also connected through a resistor 30 to positive potential B+.

In operation, consider control transistor T1 is forward biased and is in a saturated condition, while control transistor T2 is reverse biased and is thus cut off or not conducting. The potential of the collector 14 of transistor T1 will be approximately at ground potential. For purposes of explanation, assume B+ potential is 30 volts. The base 16 of transistor T3 will be at some potential between 30 volts and ground reference depending on the values of the resistors 20 and 15, which effect a voltage division. Resistors 20 and 15 may be equal in value and therefore base 16 of transistor T3 is at about 15 volts since the impedance of the saturated transistor T1 is nil. This tends to forward bias the transistor T3.

Since control transistor T2 is cut off, the potential of its collector 23 is approximately 30 volts; therefore, the potential on the base 26 of transistor T4 will also be approximately 30 volts.

The potential of emitter 27 of transistor T4 will also be very close to 30 volts (T4 is connected as an emitter follower). Assume the load 10 has a potential drop across it of 10 volts. Accordingly, the emitter 17 of transistor T3 will be at approximately 20 volts (30 volts minus the 10 volt drop across the load). Since the base 16 of transistor T3 is at 15 volts, transistor T3 is maintained in a reverse biased condition and thus cut off.

Under the foregoing operating conditions, the only path for current to flow is from B+ potential through emitter follower T4, through the load in a first direction, resistor 19 and control transistor T1 to ground. In order to cause current to flow through the load in the opposite direction, it is only necessary to provide a signal to cut off transistor T1 to cause transistor T2 to conduct. The operation of the circuit for obtaining current flow from B+ potential through emitter follower T3, through load 10 in a second or opposite direction, resistor 29, and control transistor T2 to ground is a mirror image of the above.

Figure 4A:
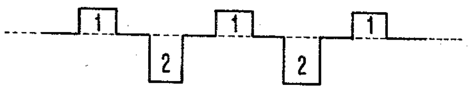

As indicated, the amplitude of the current flowing through load 10 in the two directions is equal if resistors 19 and 29 are of the same resistive value. The current wave forms shown in FIG. 4*a* show an example of the operation of FIG. 1 in which resistor 19 is of relatively higher resistive value than resistor 29. Cycle 1 indicates the current flowing through load 10 and resistor 19, that is, when transistors T1 and T4 are conducting; cycle 2 indicates the current flowing through load 10 and resistor 29, that is, when transistors T2 and T3 are conducting. Obviously with other arrangements of resistive values, wave forms having other amplitudes can be obtained.

FIG. 2 shows a modification of the circuit of FIG. 1 in which impedances Z1, Z2, Z3 and Z4 are employed in the circuit. Impedances Z1 and Z2 are connected in series between the collector 14 of transistor T1 and the emitter 16 of transistor T3. The junction of impedances Z1 and Z2 is connected to one terminal of load 10. Likewise, impedances Z3 and Z4 are connected in series between the collector 23 of transistor T2 and the emitter 27 of transistor T4. The junction of impedances Z3 and Z4 is connected to the other terminal of load 10. Impedances Z1, Z2, Z3 and Z4 may be either resistances or diodes. The impedances are not required in every location. Either Z1 and Z3 is required or Z2 and Z4 is required. However, all 4 may be used if desired. Resistors 15, 20 and 25, 30 are arranged to provide voltage division of a desired ratio, that is, to provide biasing of the respective emitter followers T3 and T4 to control the amplitude of the current flowing therethrough. As is known, resistors 20 and 30 must have some finite value even though resistors 15 and 25 may have a value of zero resistance. In operation the transistors T3 and T4 will be reverse biased to a point depending on the voltage division of the two transistors.

FIG. 3 shows an additional embodiment of the circuit of the invention in which additional control transistors T5 and T6 are included in the circuit. T5 is connected in parallel with transistor T1, and transistor T6 is connected in parallel with transistor T2. More specifically collector 41 of transistor T5 is connected through a resistor 42 to one terminal of load 10. Transistor T6 has its collector 44 connected through a resistor 45 to the other terminal of load 10. In addition, the circuit of FIG. 3 includes isolation diodes 46, 47, 48 and 49. Diode 46 is connected in series between resistor 15 and the collector 14 of transistor T1; diode 47 is connected in series between resistor 15 and the collector 41 of transistor T5; diodes 48 and 49 are similarly connected to respective transistors T2 and T6.

By timing the application of control signals to two of the four transistors, that is, T1, T5 and T2, T6 to be either simultaneous or staggered the amplitude of the current flowing through the load can be varied in both directions. The amplitude of the current is also determined by the resistive value of the current limiting resistors 19, 42, 29 and 45; by adjusting these resistor values the current flowing in one direction may be controlled to be different in amplitude from the current flowing in the other direction.

Figure 4B:
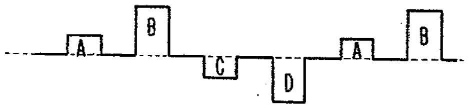

To obtain the wave form shown in FIG. 4*b*, resistors 19 and 29 are chosen to have relatively higher resistive values than resistors 42 and 45. Transistor T1 is pulsed to conduct during the cycle wave form labeled A; transistor T5 is pulsed to conduct during the cycle labeled B; transistor T2 is pulsed to conduct during the cycle labeled C; and transistor T6 is pulsed to conduct during the cycle labeled D.

Figure 4C:
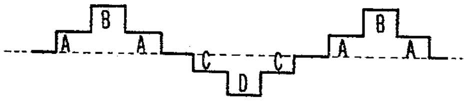

Note that to obtain the wave form of FIG. 4*b*, there is a rest or zero period between each cycle. In contrast in FIG. 4*c*, a series of control pulses may be applied to the control transistors and a zero period provided only at designated intervals. In this case, a control signal pulse may be applied to T1 at cycle A, either one or both transistors T1 and T5 may be pulsed at cycle indicated as B, and control signal pulses are likewise applied to transistors T1 and T6 during the cycles indicated as C and D.

Thus, a bilateral current driver is provided which is capable of providing current of selected amplitude through the load in both directions; control signals coupled to control transistors provide full control of the current flowing through a load.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bilateral current driver arranged to be connected to a suitable source of energizing potential for driving current in one or another direction through a load in accordance with bivalued input control signals comprising:
 - first and second transistor pairs;
 - current limiting means;
 - each pair including a control transistor connected in series through a respective current limiting means to an emitter follower transistor, the transistors being of the same conductive type and each having a base, emitter and collector;
 - the collectors of the control transistors and the emitters of the emitter follower transistors being connected to their respective current limiting means, the emitters of the control transistors being connected individually to the source of energizing potential;
 - a load having two terminals, each connected to a respective current limiting means;
 - first and second bias means, each connected to the base and emitter of a respective emitter follower transistor;
 - each control transistor being normally maintained in its nonconductive state by the input control signals of one value, whereby current flow through the transistors and the load is prevented when the control signals applied to the bases of the control transistors are of said one value; and
 - each control transistor responsive to input control signals of a second value applied to its base to cause current flow in a path through its emitter-collector circuit, the load, the emitter follower transistor of the other pair, and a respective current limiting means, and to reverse bias its respective emitter follower transistor to its nonconductive state.

2. A bilateral current driver arranged to be connected to a suitable source of energizing potential for driving current in one or another direction through a load in accordance with bivalued input control signals comprising:
 - first and second transistor pairs;
 - current limiting means;

each pair including a control transistor connected in series through a respective current limiting means to an emitter follower transistor, the transistors being of the same conductive type and each having a base, emitter and collector;

the collectors of the control transistors and the emitters of the emitter follower transistors being connected to their respective current limiting means, the emitters of the control transistors being connected individually to the source of energizing potential;

a load having two terminals, each connected to a respective current limiting means;

first and second impedance means each having two end terminals and an intermediate terminal, each impedance means being associated with a respective pair of transistors;

the two end terminals of each impedance means being connected respectively to the emitter and collector of the emitter follower transistor of the associated pair and the intermediate terminal being connected to the base of the associated emitter follower transistor;

each control transistor being normally maintained in its nonconductive state by the input control signals of one value, whereby current flow through the transistors and the load is prevented when the control signals applied to the bases of the control transistors are of said one value; and each control transistor responsive to input control signals of a second value applied to its base to cause current flow in a path through its emitter-collector circuit, the load, the emitter follower transistor of the other pair, and a respective current limiting means, and to reverse bias its respective emitter follower transistor to its nonconductive state.

3. A bilateral current driver arranged to be connected to a suitable source of energizing potential for driving current in one or another direction through a load in accordance with bivalued input control signals comprising:

first and second transistor pairs;

current limiting means;

each pair including a first control transistor connected in series through a respective current limiting means to an emitter follower transistor, the transistors being of the same conductive type and each having a base, emitter and collector;

the collectors of the control transistors and the emitters of the emitter follower transistors being connected to their respective current limiting means, the emitters of the control transistors being connected individually to the source of energizing potential;

a load having two terminals, each connected to the emitter of a respective emitter-follower;

first and second impedance means each having two end terminals and an intermediate terminal, each impedance means being associated with a respective pair of transistors;

the two end terminals of each impedance means being connected respectively to the emitter and collector of the emitter follower transistor of the associated pair and the intermediate terminal being connected to the base of the associated emitter follower transistor;

each control transistor being normally maintained in its nonconductive state by the input control signals of one value, whereby current flow through the transistors and the load is prevented when the control signals applied to the bases of the control transistors are of said one value; and each control transistor responsive to input control signals of a second value applied to its base to cause current flow in a path through the emitter follower transistor of the other pair, the load, its emitter-collector circuit and its respective current limiting means, and to reverse bias its respective emitter follower transistor to its nonconductive state.

4. The bilateral current driver of claim 3 including at least one additional control transistor of the same conductivity type associated with at least one pair;

the additional control transistor including an emitter connected individually to the source of energizing potential, a base adapted to receive bivalued input control signals to operate the transistor alternatively in its conductive or nonconductive state and a collector;

an additional current limiting means connecting the collector of the additional transistor to the emitter of its respective emitter follower; and respective unidirectional current conducting devices connecting the collectors of the first and additional transistors to their associated impedance means;

the current limiting means having selected values determining the amplitude of the current flowing through the load in accordance with the selective operation of the first and additional control transistors.

5. The bilateral current driver of claim 3 including a third control transistor of the same conductivity type associated with each pair, each including a collector, an emitter connected individually to the source of energizing potential and a base adapted to receive bivalued input control signals to operate the transistor alternatively in its conductive or nonconductive state;

respective second current limiting means connecting the collector of each third transistor to the emitter of its respective emitter follower; and respective unidirectional current conducting devices connecting the collectors of the associated first and third transistors to their associated impedance means;

the current limiting means having selected values determining the amplitude of the current flowing through the load in accordance with the selective operation of the first and third transistors.

References Cited by the Examiner

UNITED STATES PATENTS

| | | | |
|---|---|---|---|
| 2,652,460 | 9/53 | Wallace | 307—88.5 |
| 2,740,847 | 4/56 | Cahill | 330—72 |
| 2,821,639 | 1/58 | Bright et al. | 307—88.5 |
| 3,038,091 | 6/62 | Clapper | 307—88.5 |
| 3,050,642 | 8/62 | Rogers et al. | 307—88.5 |
| 3,073,969 | 1/63 | Skillen | 307—88.5 |

ARTHUR GAUSS, *Primary Examiner.*